United States Patent
Kawakami (10) Patent No.: US 10,873,096 B2
(45) Date of Patent: Dec. 22, 2020

(54) SOLID-OXIDE CELL, CELL STACK DEVICE AND MODULE, AND MODULE HOUSING DEVICE

(71) Applicant: KYOCERA Corporation, Kyoto (JP)

(72) Inventor: Masashi Kawakami, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 108 days.

(21) Appl. No.: 14/780,656

(22) PCT Filed: Mar. 18, 2014

(86) PCT No.: PCT/JP2014/057328
§ 371 (c)(1),
(2) Date: Sep. 28, 2015

(87) PCT Pub. No.: WO2014/156830
PCT Pub. Date: Oct. 2, 2014

(65) Prior Publication Data
US 2016/0064752 A1    Mar. 3, 2016

(30) Foreign Application Priority Data
Mar. 28, 2013   (JP) .................................. 2013-069245

(51) Int. Cl.
*H01M 8/10*    (2016.01)
*H01M 2/38*    (2006.01)
(Continued)

(52) U.S. Cl.
CPC .......... *H01M 8/04201* (2013.01); *C25B 9/00* (2013.01); *H01M 8/0202* (2013.01);
(Continued)

(58) Field of Classification Search
CPC ................................ H01M 8/24; H01M 8/004
See application file for complete search history.

(56) References Cited

U.S. PATENT DOCUMENTS 5,209,989 A * 5/1993 Ishihara .............. H01M 8/0258
429/456
5,573,867 A * 11/1996 Zafred .............. H01M 8/04089
429/410
(Continued)

FOREIGN PATENT DOCUMENTS

JP    2004-146334 A    5/2004
JP    2012-248473 A    12/2012

OTHER PUBLICATIONS

International Search Report (PCT/ISA/210) dated Apr. 15, 2014 and issued for International Patent Application No. PCT/JP2014/057328.
(Continued)

*Primary Examiner* — Cynthia H Kelly
*Assistant Examiner* — Julian Anthony
(74) *Attorney, Agent, or Firm* — Procopio Cory Hargreaves and Savitch LLP (57) ABSTRACT

A solid-oxide cell includes a porous substrate and an element part. The porous substrate has a long shape in a longitudinal direction and includes a first main surface, a second main surface, a first side surface, a second side surface and a gas-flow passage. The second main surface faces the first main surface. The second side surface faces the first side surface. The first and the second side surfaces connect the first main surface to the second main surface. The gas-flow passage extends in the longitudinal direction. The element part is provided on the first main surface and includes a first electrode layer, a solid electrolyte layer and a second electrode layer. A thickness at an end portion in the longitudinal direction of the porous substrate is greater than a thickness at a center portion in the longitudinal direction of the porous substrate.

11 Claims, 5 Drawing Sheets

(51) Int. Cl.

| | |
|---|---|
| *H01M 2/40* | (2006.01) |
| *H01M 8/24* | (2016.01) |
| *H01M 8/04082* | (2016.01) |
| *H01M 8/2457* | (2016.01) |
| *H01M 8/2485* | (2016.01) |
| *H01M 8/243* | (2016.01) |
| *H01M 8/12* | (2016.01) |
| *C25B 9/00* | (2006.01) |
| *H01M 8/023* | (2016.01) |
| *H01M 8/0247* | (2016.01) |
| *H01M 8/0202* | (2016.01) |
| *H01M 8/1004* | (2016.01) |
| *H01M 8/1246* | (2016.01) |
| *H01M 8/124* | (2016.01) |

(52) U.S. Cl.
CPC ......... *H01M 8/023* (2013.01); *H01M 8/0247* (2013.01); *H01M 8/1004* (2013.01); *H01M 8/12* (2013.01); *H01M 8/1246* (2013.01); *H01M 8/243* (2013.01); *H01M 8/2457* (2016.02); *H01M 8/2485* (2013.01); *H01M 2008/1293* (2013.01); *H01M 2300/0074* (2013.01)

(56) References Cited

U.S. PATENT DOCUMENTS

| | | | |
|---|---|---|---|
| 2005/0008921 A1* | 1/2005 | Johnson | H01M 8/025 429/514 |
| 2006/0147787 A1* | 7/2006 | Yamauchi | H01M 8/0208 429/457 |
| 2010/0009228 A1* | 1/2010 | Zafred | H01M 8/122 429/423 |

OTHER PUBLICATIONS

Office Action dated Nov. 4, 2016 issued in counterpart Chinese Application No. 201480014191.5.
Office Action dated Jul. 21, 2017 issued in counterpart Chinese Application No. 201480014191.5.

* cited by examiner

SOLID-OXIDE CELL, CELL STACK DEVICE AND MODULE, AND MODULE HOUSING DEVICE

TECHNICAL FIELD

The present invention relates to a solid-oxide cell, a cell stack device and an module and an module housing device.

BACKGROUND

Conventionally, a solid-oxide fuel cell having an electric generating element part configured with a solid electrolyte layer that is interposed between a fuel electrode layer and an oxygen electrode layer is known.

Examples of a solid-oxide fuel cell (abbreviated as fuel cell, or cell in some cases below) include a hollow and flat plate cell, in which the electric generating element part such as described above is provided on an electrically conductive porous substrate including a gas-flow passage in the interior thereof. In such a hollow and flat plate fuel cell, by passing fuel gas (e.g. hydrogen-containing gas) through the gas-flow passage disposed in the porous substrate interior, hydrogen is supplied to a fuel electrode layer side of the solid electrolyte layer through the gas-flow passage in the porous substrate interior. At the same time, by passing oxygen-containing gas such as air to the fuel cell exterior, oxygen is supplied to the oxygen electrode layer side of the solid electrolyte layer. Thereby electricity is generated in the electric generating element part configured with a solid electrolyte layer which is interposed between the fuel electrode layer and the oxygen electrode layer and the electricity generated is delivered through an inter-connector layer provided on the porous substrate (e.g. see Patent Document 1)

PRIOR ART DOCUMENT

Patent Document

Patent Document 1: Japanese Unexamined Patent Application Publication No. 2004-146334A

SUMMARY OF THE INVENTION

Problems to be Solved by the Invention

However, for a conventional solid-oxide fuel cell described in Patent Document 1, a cell end portion may break in case that the end portion is subjected to some impact, or stress concentration.

The object of the present invention is to provide a solid-oxide cell, a cell stack device and an module, and an module housing device wherein breakage of the end portion is reduced.

Means to Solve the Problem

A solid-oxide cell includes a porous substrate and an element part. The porous substrate has a long shape in a longitudinal direction. The porous substrate includes a first main surface, a second main surface, a first side surface, a second side surface and a gas-flow passage. The second main surface faces the first main surface. The second side surface faces the first side surface. The first side surface and the second side surface connect the first main surface to the second main surface. The gas-flow passage extends in the longitudinal direction. The element part is provided on the first main surface of the porous substrate. The element part includes a first electrode layer, a solid electrolyte layer and a second electrode layer. A thickness at an end portion in the longitudinal direction of the porous substrate is greater than a thickness at a center portion in the longitudinal direction of the porous substrate.

A solid-oxide cell includes a porous substrate, a solid electrolyte layer and a second electrode layer. The porous substrate has a long shape in a longitudinal direction. The porous substrate includes a first main surface, a second main surface, a first side surface, a second side surface and a gas-flow passage. The second main surface faces the first main surface. The second side surface faces the first side surface. The first side surface and the second side surface connect the first main surface to the second main surface. The gas-flow passage extends in the longitudinal direction. The solid electrolyte layer is provided on the first main surface, the first side surface and the second side surface. The second electrode layer is provided on the solid electrolyte layer. A thickness at both end portions in the longitudinal direction of the porous substrate is greater than a thickness at a center portion in the longitudinal direction of the porous substrate. Another solid-oxide cell includes a porous substrate and an element part. The porous substrate has a long shape in a longitudinal direction. The porous substrate includes a first main surface, a second main surface, a first side surface, a second side surface and a gas-flow passage. The second main surface faces the first main surface. The second side surface faces the first side surface. The first side surface and the second side surface connect the first main surface to the second main surface. The gas-flow passage extends in the longitudinal direction. The element part is provided on the first main surface of the porous substrate. The element part includes a first electrode layer, a solid electrolyte layer and a second electrode layer. A width at the end portion in the longitudinal direction of the porous substrate is greater than a width at the center portion in the longitudinal direction of the porous substrate.

A cell stack device connected to a gas tank, includes an electrically connected plurality of solid-oxide cells described above. An interior space of the gas tank communicates with the gas-flow passage of the solid-oxide cell.

An module of the present invention includes a storage container containing the solid-oxide cell described above.

A module housing device includes an exterior casing containing the module described above and an auxiliary devices to operate the module.

Effect of the Invention

In the solid-oxide cell of the present invention, because the thickness T2 at the center portion in the longitudinal direction of the porous substrate is thin, supply of gas passing through the gas-flow passage of the porous substrate to the solid electrolyte layer surface is facilitated, thereby the efficiency of the solid-oxide cell can be improved. Meanwhile, because the thicknesses of the both end portions in the longitudinal direction of the porous substrate are greater than the thickness at the center portion, mechanical strength of the end portions is improved, and events of breakage can be reduced. Thereby, high performance, reliable cell stack device, module and module housing device can be provided.

BRIEF DESCRIPTION OF THE DRAWING(S)

FIGS. 1A and 1B illustrate one form of a solid-oxide fuel cell.

FIGS. 3A and 3B illustrate one form of a fuel cell stack device.

BEST MODE FOR CARRYING OUT THE INVENTION

Figure 1A:
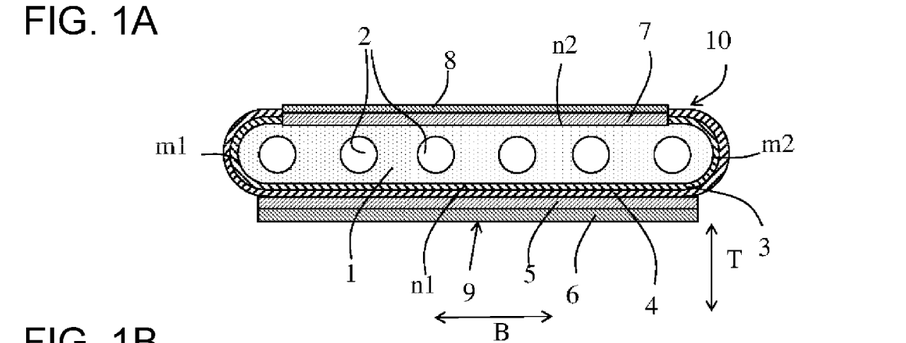
FIG. 1A is a cross sectional view and FIG. 1B is a longitudinal-sectional view.
Figure 1B:
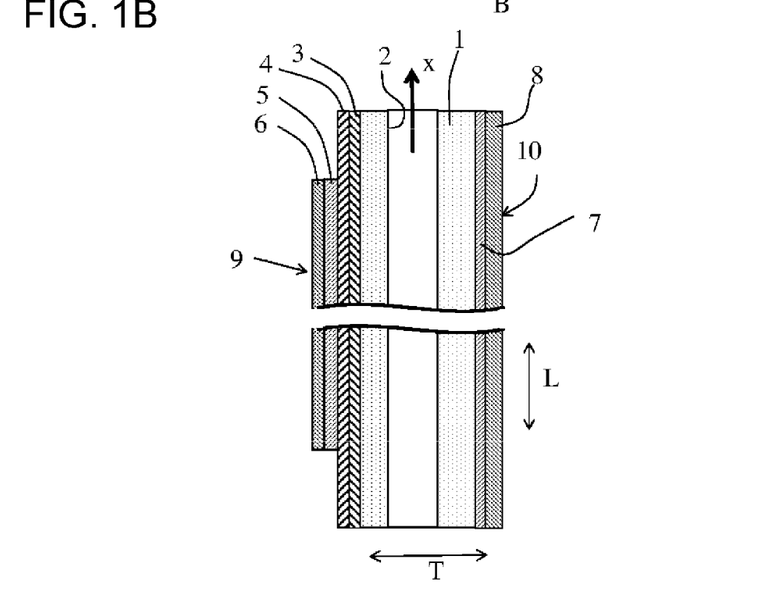

FIGS. 1A and 1B illustrate one form of the solid-oxide cell of the present invention applied for a solid-oxide fuel cell (abbreviated as fuel cell or cell in some cases hereinafter) 10, and FIG. 1A illustrates a cross sectional view thereof and FIG. 1B illustrates a longitudinal-sectional view thereof. In both figures, portions of individual configuration of the fuel cell 10 are illustrated in enlarged views.

The fuel cell 10 is a hollow and flat plate fuel cell 10 and includes an electrically conductive long shape porous substrate 1 containing Ni with a flat cross-section. In the interior of the porous substrate 1, a plurality of gas-flow passages 2 is extended from one side (the lower side) to the other side (the upper side) in the longitudinal direction L of the porous substrate 1. The fuel cell 10 has a structure, in which various members are provided on the porous substrate 1. The plurality of the gas-flow passages 2 is formed in the transverse direction B of the porous substrate 1, with each gas-flow passage 2 formed at a predetermined interval and penetrating through the porous substrate 1 in the longitudinal direction L. The long shape porous substrate 1 is the porous substrate 1 that has a length in a longitudinal direction L is greater than the width.

As can be understood from the form illustrated in FIGS. 1A and 1B, the porous substrate 1 has a pair of mutually facing first and second main surfaces n1, n2 (flat faces) and a pair of mutually facing first and second side surfaces m1, m2 (curved faces) which connects the first and second main surfaces n1, n2 together. The first main surface n1 and second main surface n2 are formed substantially parallel to each other and the porous fuel electrode layer 3 (first electrode layer) is provided to cover the first main surface n1 (the lower face) and the pair of first and second side surfaces m1, m2. Furthermore, a dense solid electrolyte layer 4 is laminated to cover the fuel electrode layer 3. Also, a porous oxygen electrode layer 6 (second electrode layer) is laminated over the solid electrolyte layer 4 so as to face the fuel electrode layer 3 interposing an anti-reaction layer 5. Also, a dense inter-connector layer 8 is provided over the second main surface n2 (the upper face) that is not laminated either with the fuel electrode layer 3 or with the solid electrolyte layer 4, interposing a middle layer 7. An electric generating element part 9, which is configured by the solid electrolyte layer 4 interposed between the fuel electrode layer 3 and the oxygen electrode layer 6, is primarily formed on the center portion in the longitudinal direction of the first main surface n1 of the porous substrate 1. The areas of the first and second main surfaces n1, n2 are sufficiently greater than the areas of the first and second side surfaces m1, m2.

In another words, the electric generating element part 9, which is configured by the solid electrolyte layer 4 interposed between the fuel electrode layer 3 and the oxygen electrode layer 6, is provided over the first main surface n1 of the porous substrate 1, and the middle layer 7 and the inter-connector layer 8 are formed on the second main surface n2.

The middle layer 7 between the inter-connector layer 8 and the porous substrate 1 has a similar composition as that of the fuel electrode layer 3, and contains Ni and ceramic material (e.g. YSZ) for example. The composition may further include $Y_2O_3$ together with the composition above.

The fuel electrode layer 3 and the solid electrolyte layer 4 are formed to extend up to the second main surface n2 (the upper side) from the first main surface n1 via the first and the second side surfaces m1, m2. The both ends of the inter-connector layer 8 are disposed on the both ends of the solid electrolyte layer 4. Thereby the dense solid electrolyte layer 4 and the inter-connector layer 8 surround the circumference of the porous substrate 1 to prevent the fuel gas passing through a dense cylindrical interior from leaking to the exterior.

Figure 2A:
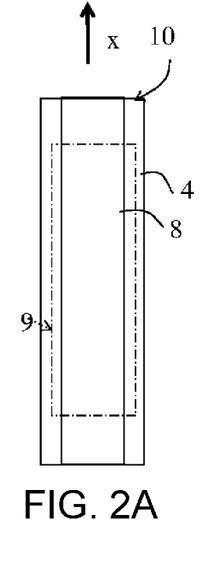
FIG. 2A is a side view of the solid-oxide fuel cell illustrated in FIGS. 1A and 1B.
Figure 2B:
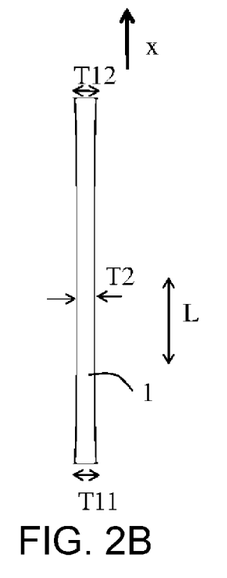
FIG. 2B is a front view of a porous substrate and FIG. 2C is a side view of the porous substrate.
Figure 2C:
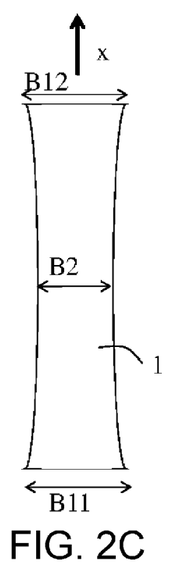

In addition, as illustrated in FIG. 2B, the porous substrate 1 is formed so that the thicknesses T11, T12 at the both end portions are greater than the thickness T2 at the center portion in the longitudinal direction L. Also, the porous substrate 1 is formed so that the widths B11, B12 at the both end portions are greater than the width B2 at the center portion in the longitudinal direction L. The thicknesses and the widths in FIGS. 2B and 2C are enlarged.

The thicknesses of the both end portions in the longitudinal direction L of the porous substrate 1, that is, the thickness T11 of one end portion (the bottom portion) and the thickness T12 of the other end portion (the top portion) in the longitudinal direction L, as illustrated in FIG. 2B, are preferably not more than 1.03 times the thickness T2 at the center portion. Also, the thicknesses T11, T12 at the both end portions are not less than 1.005 times the thickness T2 at the center portion, and preferably not less than 1.01 times the thickness T2 at the center portion. Specifically, the thicknesses T11, T12 at the both end portions are preferably not less than 1.01 times and not more than 1.02 times the thickness T2 at the center portion. The thicknesses T11, T12 at the both end portions are the thicknesses at 5 mm from the both ends in the longitudinal direction L and at the center portion in the transverse direction B of the porous substrate 1. The thickness T2 at the center portion is the thickness at the center portion in the longitudinal direction L and the center portion in the transverse direction B of the porous substrate 1. The thickness of the porous substrate 1 may increase stepwise or gradually from the center to the both ends. In FIG. 2B, the case for gradual increase in the thickness to the both ends is illustrated.

The widths B11, B12 at the both end portions in the longitudinal direction L of the porous substrate 1 are preferably not more than 1.02 times the width B2 at the center portion. Specifically, the widths B11, B12 at the both end portions are preferably not less than 1.005 times and not more than 1.01 times the width B2 at the center portion. The widths B11, B12 at the both end portions are the widths at 5 mm from the both ends in the longitudinal direction L. The width B2 at the center portion is the width at the center in the longitudinal direction L of the porous substrate 1. The width of the porous substrate 1 may increase stepwise or gradually from the center to the both ends. In FIG. 2C, the case for gradual increase in the widths to the both ends is illustrated.

The thicknesses T11, T12 and T2 of the porous substrate 1 are the distances between the first main surface n1 and the second main surface n2. The widths B11, B12 and B2 of the porous substrate 1 are the distances between the first side surface m1 and the second side surface m2.

Because it is necessary to supply fuel gas passing through the gas-flow passage 2 in the interior to the fuel electrode layer 3 side of the solid electrolyte layer 4, for the porous substrate 1, the distance from the gas-flow passage 2 to the solid electrolyte layer 4 is preferably short. Also, because the porous substrate 1 is electrically conductive and the electrical current passes between the electric generating element part 9 and the inter-connector layer 8 in the thickness direction of the porous substrate 1 rectilinearly, the thickness of the porous substrate 1 is preferably thin. However, because the both end portions of the fuel cell 10 may break in the case the both end portions are subjected to some impact, the thickness of the end portions of the porous substrate 1 is preferably thick.

In the embodiment described above, because the thicknesses T11, T12 at the both end portions are thicker than the thickness T2 at the center portion in the longitudinal direction L of the porous substrate 1, the mechanical strength of the both end portions can be improved and the possibility of breakage at the both end portions of the fuel cell 10 can be reduced. Also, because the thickness T2 at the center portion is thinner than the thicknesses T11, T12 at the both end portions, the fuel gas supply to the solid electrolyte layer 4 is facilitated, and furthermore, the distance between the electric generating element part 9 and the inter-connector layer 8, which are arranged to mutually face each other in the thickness direction T of the porous substrate 1 is short, and the electrical current loss flowing in the thickness direction T of the porous substrate 1 is reduced, thereby fuel cell 10 power generation efficiency can be improved.

Furthermore, because the widths B11, B12 at the both end portions are wider than the width B2 at the center portion, the curved face of the both end portions, which are mechanically weak, can be reinforced.

Porous Substrate 1

It is required for the porous substrate 1 to have gas permeability to permeate fuel gas to the fuel electrode layer 3, and to be electrically conductive to collect current via the inter-connector layer 8. While satisfying these requirements, in order to avoid troubles due to firing at the same time, the porous substrate 1 can be configured with a metal component of an iron group and a ceramic component, for example, particular rare earth oxide. However, this is not limited hereto.

The metal component of the iron group is to impart electrical conductivity to the porous substrate 1, and can be a metal of the iron group alone or a metal oxide of the iron group, alloy of metal or metal oxide of the iron group. Metals of the iron group include Fe, Ni and Co, and any one of these metals can be used in the present embodiment. Because of low cost and stability in the fuel gas, at least one of Ni and NiO is preferably included as the metal component of the iron group.

Meanwhile, the rare earth oxide is used for bringing the thermal expansion coefficient of the porous substrate 1 close to the thermal expansion coefficient of the solid electrolyte layer 4. In order to maintain high electrical conductivity and to prevent elemental diffusion into the solid electrolyte layer 4 and the like, a rare earth oxide containing at least one kind of rare earth element selected from the group consisting of Y, Lu, Yb, Tm, Er, Ho, Dy, Gd, Sm and Pr is used in combination with the metal component of the iron group described above. Examples of the rare earth oxides include $Y_2O_3$, $Lu_2O_3$, $Yb_2O_3$, $Tm_2O_3$, $Er_2O_3$, $Ho_2O_3$, $Dy_2O_3$, $Gd_2O_3$, $Sm_2O_3$, $Pr_2O_3$. Among them, $Y_2O_3$, $Yb_2O_3$ are particularly desirable, because they are inexpensive.

These rare earth oxides rarely form a solid solution or undergo reactions with a metal of the iron group or an oxide thereof during firing or electric generation. Furthermore, a metal of the iron group or an oxide thereof and the rare earth oxide described above rarely diffuse in the porous substrate 1. Therefore, even if the porous substrate 1 and the solid electrolyte layer 4 are fired simultaneously, diffusion of a rare earth element into the solid electrolyte layer 4 is effectively reduced and an adverse effect to ion conductivity in the solid electrolyte layer 4 can be avoided.

Particularly, in order to bring the thermal expansion coefficient of the porous substrate 1 close to the thermal expansion coefficient of the solid electrolyte layer 4, the metal of the iron group described above is preferably included in the amount from 35 to 70 volume % in the porous substrate 1, and the rare earth oxide described above is preferably included in the amount from 30 to 65 volume % in the porous substrate 1. Meanwhile, other metal components or oxide components can be included in the porous substrate 1 in the range in which they do not impair required characteristics.

As it is necessary for the porous substrate 1 configured with the metal component of the iron group and the rare earth oxide described above to have fuel gas permeability, open porosity is usually preferably not less than 30%, and particularly in the range from 35 to 50%. The electrical conductivity of the porous substrate 1 is preferably not less than 300 S/cm, and particularly not less than 440 S/cm.

Also, the thickness of the porous substrate 1 is usually set in the range from 2 to 35 mm, and the length of the porous substrate 1 is optionally set according to application. For electric generation use in general home, the length of the porous substrate 1 is usually set to about from 50 to 250 mm. Furthermore, the first and the second side surfaces m1, m2 are formed at the both ends of the first main surface n1 and the second main surface n2 to prevent a chip at the corner portion and, moreover, to increase the mechanical strength. In order to prevent delamination of the solid electrolyte layer 4, the radii of curvature for the first and the second side surfaces m1, m2 may be not more than 5 mm, and preferably in the range from 1 to 5 mm.

Fuel Electrode Layer 3

The fuel electrode layer 3 promotes the electrode reaction, and itself can be formed of a known porous cermet. For example, it may be formed from $ZrO_2$ or $CeO_2$ that forms a solid solution with the rare earth oxide and at least one of Ni and NiO.

The amount of $ZrO_2$ or $CeO_2$ in the fuel electrode layer 3 is preferable in the range from 35 to 65 volume % and the amount of Ni or NiO in the fuel electrode layer 3 is preferable in the range from 65 to 35 volume %. Furthermore, the open porosity of the fuel electrode layer 3 is preferably not less than 15%, and particularly preferable in the range from 20 to 40%. The thickness of the fuel electrode layer 3 is preferable from 1 to 30 μm, to prevent performance reduction, delamination due to thermal expansion difference and the like.

Also, as an example of a rare earth oxide, which forms a solid solution in $ZrO_2$ or $CeO_2$, the similar substances listed for the rare earth oxide used in the porous substrate 1 can be listed. From the viewpoint of lowering the polarization value of the cell, it is preferable that for $ZrO_2$, about from 3 to 10 mole percent of $Y_2O_3$ forms a solid solution with $ZrO_2$, and for $CeO_2$, about from 5 to 20 mole percent of $Sm_2O_3$ forms a solid solution with $CeO_2$.

Furthermore, the fuel electrode layer 3 may be disposed at the position that mutually faces at least the oxygen electrode layer 6. Specifically, though in the example in FIGS. 1A and 1B, the fuel electrode layer 3 extends from the first main surface n1 of the porous substrate 1 to the second main surface n2 via the first and the second side surfaces m1, m2 and extends to the both ends of the inter-connector layer 8, the fuel electrode layer 3 can be formed only on the first main surface n1.

Though it is not illustrated in the figures, a diffusion prevention layer can be optionally provided on the fuel electrode layer 3 described above, so that such a diffusion prevention layer can be interposed between the fuel electrode layer 3 and the solid electrolyte layer 4. The diffusion prevention layer is for reducing elemental diffusion from the fuel electrode layer 3 or the porous substrate 1 to the solid electrolyte layer 4 and for avoiding performance degradation due to the insulation layer formation. The diffusion prevention layer can be formed from $CeO_2$ which forms a solid solution with $La_2O_3$, or $La_2O_3$ which forms a solid solution with $CeO_2$, or a mixture thereof. Furthermore, an oxide of the other rare earth element can be included in the diffusion prevention layer to increase the effect of terminating or reducing the elemental diffusion. Examples of the rare earth elements include Sc, Y, Pr, Nd, Pm, Sm, Eu, Gd, Tb, Dy, Ho, Er, Tm, Yb, and Lu.

Also, the diffusion prevention layer described above preferably extends, along with the solid electrolyte layer 4, to the both ends of the inter-connector layer 8. Thereby, elemental diffusion from the porous substrate 1 or the fuel electrode layer 3 to the solid electrolyte layer 4 can be further prevented.

Solid Electrolyte Layer 4

The solid electrolyte layer 4 is required to have a function as an electrolyte transferring electrons between the electrodes, as well as gas blocking properties to prevent the leaks of the fuel gas and the oxygen-containing gas such as air. A solid electrolyte forming the solid electrolyte layer 4 is preferably a dense oxide ceramic with such properties, for example, stabilized zirconia forming a solid solution with 3 to 15 mole percent of the rare earth oxide. Examples of the rare earth elements in the stabilized zirconia include Sc, Y, La, Ce, Pr, Nd, Pm, Sm, Eu, Gd, Td, Dy, Ho, Er, Tm, Yb, and Lu, but the Y and Yb are preferable from the viewpoint of cost.

Furthermore, perovskite-type lanthanum gallate-based composite oxide containing La and Ga can be used as a solid electrolyte. The composite oxide has high oxygen ion conductivity, and high power generation efficiency can be obtained by using this composite oxide as a solid electrolyte. The lanthanum gallate-based composite oxide has La and Sr at A site and Ga and Mg at B site, and, it is desirable that the lanthanum gallate-based composite oxide has a composition represented by the general formula below, for example. $(La_{1-x}Sr_x)(Ga_{1-y}Mg_y)O_3$ (where x is a number in the range $0<x<0.3$, and y is a number in the range $0<y<0.3$). The use of the composite oxide with the composition as a solid electrolyte can promote high power generation properties.

From the viewpoint of preventing gas permeation, the solid electrolyte layer 4 has a relative density (according to Archimedes' method) preferably not less than 93%, and particularly not less than 95%.

Oxygen Electrode Layer 6

The oxygen electrode layer 6 formed over the solid electrolyte layer 4 is for promoting electrode reaction and is arranged at the position mutually facing the fuel electrode layer 3 described above interposing the solid electrolyte layer 4, as illustrated in FIGS. 1A and 1B. Namely, the oxygen electrode layer 6 is arranged at least at the portion positioned on the first main surface n1 of the porous substrate 1.

The oxygen electrode layer 6 consists of sintered body grains of so-called $ABO_3$-type perovskite-type oxide. For such a perovskite-type oxide, a transition metal-type perovskite oxide, especially at least one kind among $LaMnO_3$-type oxide, $LaFeO_3$-type oxide and $LaCoO_3$-type oxide, which have La at A site, is suitable. From the viewpoint of high electrical conductivity at relatively low temperature of 600 to 1000° C. and an excellent surface diffusion function and volume diffusion function for oxygen ions, (La, Sr)(Co, Fe)$O_3$-type oxide, for example, a composite oxide having a composition represented by the general formula below $La_ySr_{1-y}Co_zFe_{1-z}O_3$ (where y is a number in the range $0.5 \leq y \leq 0.7$, and z is a number in the range $0.2 \leq z \leq 0.8$), is particularly suitable.

Meanwhile, the oxygen electrode layer 6 is also required to have gas permeability. Therefore, electrically conductive ceramics (perovskite-type oxide) have open porosity preferably not less than 20%, particularly in the range from 30 to 50%. Also the thickness of the oxygen electrode layer 6 is preferably from 30 to 100 μm from the viewpoint of electrical current collection.

Additionally, the oxygen electrode layer 6 may be formed on the solid electrolyte layer 4, but an anti-reaction layer 5 can be provided on the solid electrolyte layer 4, thereby the oxygen electrode layer 6 is laminated over the solid electrolyte layer 4 via the anti-reaction layer 5. The anti-reaction layer 5 is for blocking elemental diffusion from the oxygen electrode layer 6 to the solid electrolyte layer 4 and is formed from a sintered body of oxide having an elemental diffusion block function. For the oxide used in the anti-reaction layer, for example, oxide containing Ce as a component element can be used. Particularly Ce-based composite oxide, in which a rare earth oxide forms a solid solution with $CeO_2$, is suitably used, because the oxide has great elemental diffusion block properties and excellent oxygen ion electrical conductivity and electron conductivity.

Inter-Connector Layer 8

The inter-connector layer 8, which is provided on the second main surface n2 of the porous substrate 1, is made of electrically conductive ceramics, and is required to have reduction resistance and oxidation resistance because the inter-connector layer comes into contact with fuel gas (hydrogen) and oxygen-containing gas. Therefore, for the electrically conductive ceramics, lanthanum chromite-based perovskite-type oxide (LaCrO3-based oxide) is generally used. For the inter-connector layer 8, LaSrTiO3-based perovskite-type composite oxide containing Ti, for example can be used and it is not particularly limited. Also, the electrically conductive ceramics is required to be dense in order to prevent leak of the fuel gas passing through the interior of the porous substrate 1 and the oxygen-containing gas passing through the exterior of the porous substrate 1. The electrically conductive ceramics has relative density preferably not less than 93% for example, and particularly not less than 95%.

The thickness of the inter-connector layer 8 is preferably from 10 to 200 μm, from the viewpoint of gas leak prevention and electric resistance.

Manufacturing of Fuel Cell

The fuel cell 10 having the structure described above can be formed by blending and preparing a slurry of mixed powder to form the porous substrate 1 (namely, mixed powder of a metal of the iron group or oxide powder thereof and rare earth oxide powder), pore-imparting agent, organic binder, solvent, and optional dispersing agent such as methylcellulose, followed by the extrusion molding of the slurry to produce a compact for columnar porous substrate including the gas-flow passage.

Additionally, a sheet is produced using the slurry above, and the sheet is wound around the top portion and bottom portion of the compact for the porous substrate, dried and pre-fired at the temperature range from 800 to 1100° C. Using this method, the thickness of the porous substrate 1 can be made thicker stepwise from the center portion in the longitudinal direction to the both ends, and the width of the porous substrate 1 can be made wider stepwise from the center portion in the longitudinal direction to the both ends.

Alternatively, the bottom portion of the compact for the porous substrate is immersed in the dip solution prepared using the slurry described above, taken out from the dip solution, and held for pre-determined time in the state in which the dip solution inside the gas-flow passages are blown off by air blow. This is followed by the top portion being immersed in the dip solution, taken out from the dip solution, held for pre-determined time in the state in which the dip solution inside the gas-flow passages are blown off by air blow, dried and pre-fired at the temperature range from 800 to 1100° C. Using this dip and coating method, the thickness of the porous substrate 1 can be made thicker gradually from the center portion in the longitudinal direction to the both ends, and the width of the porous substrate 1 can be made wider gradually from the center portion in the longitudinal direction to the both ends. The extruded compact for the porous substrate and the film formed by dip and coating produce the same structure after the firing.

In order to make only the thickness of the porous substrate 1 thicker from the center portion in the longitudinal direction to the both ends, the sheet described above can be laminated only on the main surface of the compact for the porous substrate, or the slurry described above can be coated only on the main surface of the compact for the porous substrate by dipping.

Upon producing the compact for the porous substrate described above, a mixed powder used is, for example, a mixture of powder of metal of the iron group or oxide thereof (referred to as conductive powder hereinafter) and rare earth oxide powder, mixed at the predetermined volume ratio.

A sheet for the solid electrolyte layer (referred to as a solid electrolyte layer sheet hereinafter) is produced. Namely, a slurry for molding is prepared by mixing solid electrolyte powder such as $ZrO_2$ containing $Y_2O_3$ with an organic binder and a solvent such as toluene, and the solid electrolyte layer sheet is molded using the slurry.

Then, a sheet for the fuel electrode layer is produced using a slurry prepared by mixing powder for making the fuel electrode layer (e.g. mixed powder of NiO powder and YSZ powder) with an organic binder and a solvent. The sheet for the fuel electrode layer is laminated on one side of the solid electrolyte layer sheet described above and this is wound at the pre-determined position of the compact for the porous substrate (pre-fired body) to mutually face the sheet for the fuel electrode layer and dried.

Thereafter, a slurry is prepared by mixing powder for the inter-connector layer such as $LaCrO_3$-type material with an organic binder and a solvent and a sheet for the inter-connector layer is produced using the slurry in a usual method.

Next, a slurry is prepared by mixing powder for forming the middle layer (e.g. mixed powder of at least one of Ni and NiO powder and powder of $ZrO_2$ that forms a solid solution with the rare earth oxide) with a predetermined organic binder and solvent, and the slurry is coated on the portion of the predetermined face of pre-fired compact for the porous substrate and the coating layer for the middle layer is formed. On the coating layer for the middle layer, the sheet for the inter-connector layer is laminated and dried.

Then, after the laminated compact described above is subjected to thermal treatment to remove the binder, and the laminated compact is subjected to co-firing in the oxygen-containing atmosphere at from 1300 to 1600° C. Thereby, a sintered compact in which the fuel electrode layer 3 and the solid electrolyte layer 4 are laminated on the porous substrate 1, and the middle layer 7 and the inter-connector layer 8 are further laminated on the predetermined position, is obtained. Thereafter, the sintered compact is cut at the position at the predetermined distance from the both ends in the longitudinal direction and the sintered compact of the predetermined length is obtained.

Furthermore, a coating layer for the oxygen electrode layer can be formed by spray atomization (or dipping) of a coating solution for the oxygen electrode layer, in which $LaFeO_3$-based oxide powder and the like is dispersed in a solvent, on the anti-reaction layer 5 of the sintered compact obtained above method, then fired at from 1000 to 1300° C. Thereby, the fuel cell 10 including the oxygen electrode layer 6 can be obtained. Alternatively, the oxygen electrode layer can be formed by coating a slurry for the oxygen electrode layer. Meanwhile, in the fuel cell 10 obtained, the conductive elements included in the porous substrate 1 and the like are is converted to an oxide such as NiO, due to the firing in the oxygen-containing atmosphere. The oxide is to be reduced by reduction treatment or electric generation, during which the fuel gas is supplied through the gas-flow passage 2.

Figure 3A:
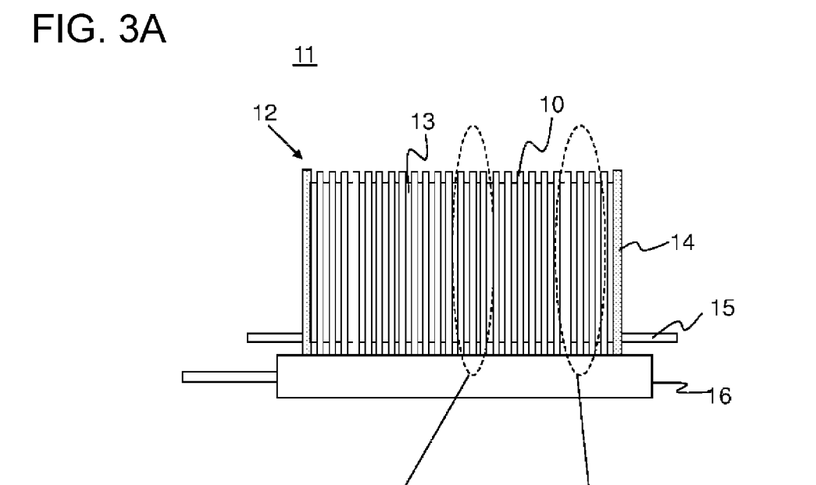
FIG. 3A is a side view illustrating the fuel cell stack device.
Figure 3B:
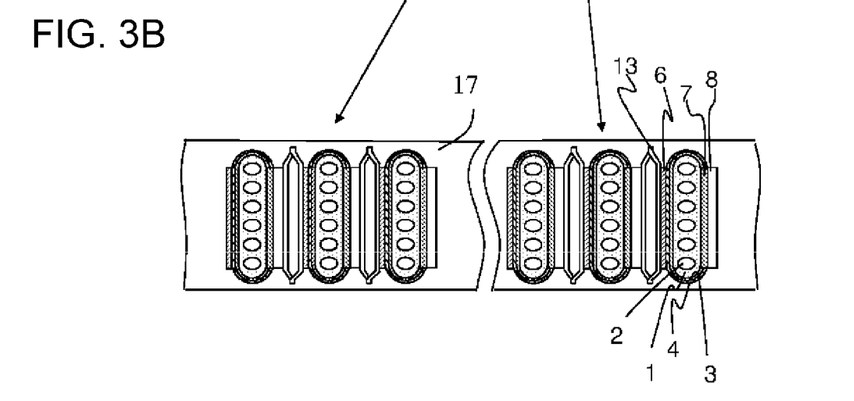
FIG. 3B is an enlarged cross sectional view of an area surrounded by a broken line in the fuel cell stack device illustrated in FIG. 1A.

In FIGS. 3A and 3B, an example of a fuel cell stack device configured by connecting two or more fuel cells 10 described above in series electrically via a current collection member 13 is illustrated. FIG. 3A is a side view illustrating the fuel cell stack device 11, and FIG. 3B is an enlarged cross-section of the part of the fuel cell stack device 11 in FIG. 3A, in which the area surrounded by a broken line in FIG. 3A is selected and illustrated. In FIG. 3B, the part corresponding to the area surrounded by a broken line in FIG. 3A is indicated by an arrow for clarification. And in the fuel cell 10 illustrated in FIG. 3B, some members such as the anti-reaction layer 5 are omitted.

Figure 4:
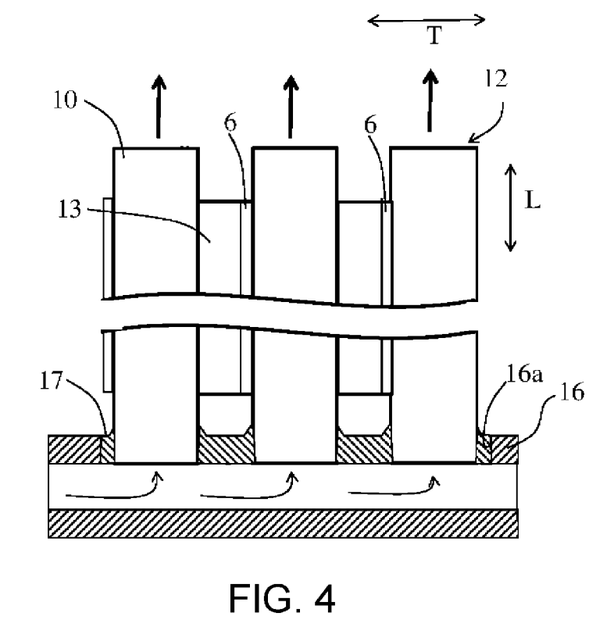
FIG. 4 is a partial longitudinal-sectional view of the fuel cell stack device of FIGS. 3A and 3B.

Meanwhile, in the fuel cell stack device 11, the cell stack 12 is configured by arranging each fuel cell 10 via the current collection member 13, and a bottom portion of each fuel cell 10 is secured on an upper wall of a gas tank 16 for supplying the fuel gas to the fuel cell 10, by a sealing member 17, as illustrated in FIG. 4. Namely, a penetrating hole 16a, into which the bottom portion of the cell stack 12 is inserted, is formed on the upper wall of the gas tank 16, and the bottom portion of the cell stack 12 is joined by the sealing member 17 such as glass, glass ceramics, in the state that the bottom portion of the cell stack 12 is inserted into the penetrating hole 16a. Incidentally, FIG. 4 illustrates the state, in which three fuel cell 10 are erected and disposed on the gas tank 16 in as a matter of convenience.

Also, as illustrated in FIGS. 3A and 3B, elastically deformable electrically conductive members 14, the lower portions thereof being secured to the gas tank 16, are provided to interpose a fuel cell stack 12 from the both ends of the arrangement direction of the fuel cell 10.

The electrically conductive members 14 are provided with a current extracting member 15 for extracting current generated by the fuel cell stack 12 (fuel cell 10) in a shape of extending towards the outside along the arrangement direction of the fuel cell 10.

In the cell stack device 11 mentioned above, because the thickness T2 at the center portion of the porous substrate 1 is thinner than the thicknesses T11, T12 at the both end portions as described above, while electric generation characteristics of the fuel cell 10 can be improved, thereby electric generation characteristics of the cell stack device is also improved, the possibility of damage of the fuel cell 10 can be reduced and the long-term reliability of the cell stack device can be improved.

Figure 5:
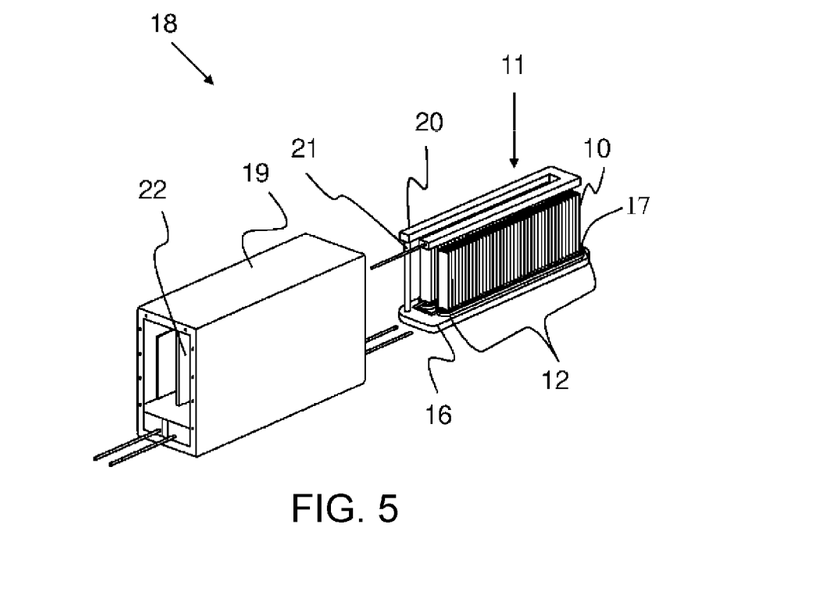
FIG. 5 is an exterior perspective view of one form of a fuel cell module.

FIG. 5 is a perspective view of the visual appearance illustrating an example of a fuel cell module 18 storing the fuel cell stack device 11 in a storage container 19. The fuel cell module 18 is configured by storing the fuel cell stack device 11 illustrated in FIGS. 3A and 3B inside a rectangular parallelepiped-shaped storage container 19.

In order to obtain the fuel gas to be used in the fuel cell 10, a reformer 20 for reforming the raw materials, such as natural gas or kerosene, to generate the fuel gas is disposed above the fuel cell stack 12. Then, the fuel gas generated in the reformer 20 is supplied to the gas tank 16 through a gas circulation tube 21, and then supplied to the gas-flow passage 2 provided inside the fuel cell 10 through the gas tank 16.

FIG. 5 illustrates a state in which the storage container 19 is partially (front and back surfaces) removed, and the cell stack device 11 and the reformer 20 stored inside are taken out backward. In the fuel cell module 18 illustrated in FIG. 5, the fuel cell stack device 11 can be allowed to slide into the storage container 19 to be stored therein. The cell stack device 11 may also be one containing the reformer 20.

An oxygen-containing gas introduction member 22 provided in the storage container 19 is disposed between a pair of fuel cell stacks 12 disposed side by side in the gas tank 16 in FIG. 5 and supplies oxygen-containing gas to the bottom portion of the fuel cell 10 in such a manner that the oxygen-containing gas flows through the side of the fuel cell 10 from the bottom portion to the top portion in accordance with the flow of the fuel gas. Then, by allowing the fuel gas to be discharged from the gas-flow passage 2 of the fuel cell 10 in the direction x to react with the oxygen-containing gas to burn the same on the top portion side of the fuel cell 10, the temperature of the fuel cell 10 can be increased, so that the starting of the cell stack device 11 can be accelerated. Moreover, by burning the fuel gas to be discharged from the gas-flow passage 2 of the fuel cell 10 and the oxygen-containing gas on the top portion side of the fuel cell 10, the reformer 20 disposed above the fuel cell 10 (fuel cell stack 12) can be warmed. Thus, the reformer 20 can efficiently perform a reforming reaction.

Furthermore, because the fuel cell module 18 of this embodiment is constituted by storing the cell stack device 11 described above in the storage container 19, the fuel cell module 18 with improved reliability over a long period of time can be achieved.

Figure 6:
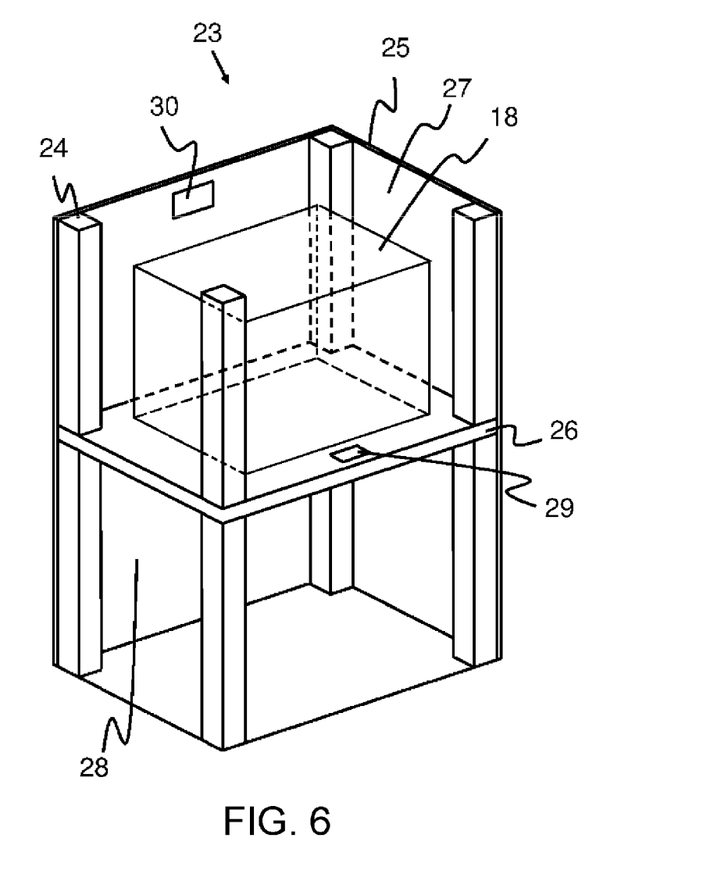
FIG. 6 is an exploded perspective view of one form of a fuel cell device.

FIG. 6 is an exploded perspective view illustrating an example of a fuel cell device storing the fuel cell module 18 illustrated in FIG. 5 and auxiliary devices for operating the cell stack device 11 in an exterior casing. In FIG. 6, the illustration of the configuration is partially omitted.

The fuel cell device 23 illustrated in FIG. 6 is configured so that the inside of the exterior casing containing supports 24 and an outer casing plate 25 is vertically divided with a dividing plate 26. The upper side is used as a module storage chamber 27 for storing the above-described fuel cell module 18. The lower side is used as an auxiliary device storage chamber 28 for storing auxiliary devices for operating the fuel cell module 18. The illustration of the auxiliary devices stored in the auxiliary device storage chamber 28 is omitted.

Moreover, the dividing plate 26 is provided with an air circulation port 29 for passing the air of the auxiliary device storage chamber 28 to the side of the module storage chamber 27. A discharge port 30 for discharging the air in the module storage chamber 27 is disposed at the part of the outer casing plate 25 constituting the module storage chamber 27.

Because of the fact that such a fuel cell device 23 is constituted by storing the fuel cell module 18 which can improve the reliability in the module storage chamber 27 as described above, the fuel cell device 23 with improved reliability can be achieved.

The present invention is not limited to the embodiment described above and can be variously altered, improved, and the like without departing from the gist of the present invention.

For example, though the fuel electrode layer 3 is provided on the electrically conductive porous substrate 1 in the embodiment above, it is acceptable that the fuel electrode layer (the first electrode layer) itself is the porous substrate.

Though a fuel cell, a cell stack device and a fuel cell module and a fuel cell device are described in the embodiment above, the present invention is not limited hereto, and can be applied to an cell, which is a solid oxide fuel cell (SOEC), in which hydrogen and oxygen ($O_2$) are generated by electrolysis of water vapor (water) while the electrolysis cell is provided with water vapor and voltage, and an electrolysis cell stack device, and electrolytic module and electrolytic device.

Furthermore, though so-called vertically-striped type, in which the electrically conductive porous substrate 1 includes one electric generating element part, is described in the embodiment above, the present invention is not limited hereto. So-called horizontally-striped type, in which an electrically insulating porous substrate includes two or more electric generating element parts, can be used.

Examples

First, NiO powder with an average grain size of 0.5 μm and $Y_2O_3$ powder with an average grain size of 0.9 μm were mixed, and pore-imparting agent, organic binder and solvent were added to produce a molding body. The molding body was molded by extrusion method, and dried to produce a compact for the porous substrate. NiO powder with an average grain size of 0.5 μm and $Y_2O_3$ powder with an average grain size of 0.9 μm were mixed, and pore-imparting agent, organic binder and solvent were added to produce a dip solution. The top portion (30 mm from the top end) and the bottom end (30 mm from the bottom end) of the compact for the porous substrate were immersed in the dip solution for 10 seconds each, taken out from the dip solution, held for 1 minute while the dip solution inside the gas-flow passages were blown off by air blow, then dried and degreased.

Using a slurry obtained by mixing $ZrO_2$ powder (solid electrolyte layer raw material powder) in which 8 mol % Y formed a solid solution having a grain size by a Microtrack method of 0.8 μm, organic binder, and solvent, a solid electrolyte layer sheet of 30 μm thickness was produced by doctor blade method.

Next, a slurry for fuel electrode layer, prepared by mixing NiO powder with average grain size of 0.5 μm and $ZrO_2$ powder in which $Y_2O_3$ formed a solid solution, organic binder and solvent, was coated on the solid electrolyte layer sheet to produce a fuel electrode layer compact. This was followed by laminating the fuel electrode layer compact with the fuel electrode layer compact side down on the compact for the porous substrate at the predetermined position.

Then, the laminated compact, which was compacts laminated as described above, was pre-fired at 1000° C. for 3 hours.

Next, a slurry for an anti-reaction layer prepared by mixing $CeO_2$ powder, in which $Gd_2O_3$ formed a solid solution, organic binder and solvent was coated on the solid electrolyte layer pre-fired body of the laminated pre-fired body using screen printing method, to produce an anti-reaction layer compact.

Then, a slurry was prepared by mixing $L_a(Mg_{0.3}Cr_{0.7})_{0.96}O_3$, organic binder and solvent and an inter-connector layer sheet was prepared.

A slurry for a middle layer was prepared by mixing and drying raw materials consisted of Ni and YSZ, and mixing organic binder and solvent thereto. The prepared slurry for the middle layer was coated on the portion on which the fuel electrode layer (and the solid electrolyte layer) of the compact for the porous substrate was not formed (the portion that the compact for the porous substrate was exposed) and the middle layer compact was laminated. An inter-connector layer sheet was laminated on the middle layer compact.

Subsequently, the laminated compact described above was subjected to binder removal treatment, and to simultaneous firing at 1450° C. for 2 hours in atmosphere. A sintered compact of 200 mm in length was produced and the sintered compact was cut at the position 15 mm from the both ends in longitudinal direction.

Next, a mixture solution of $La_{0.8}Sr_{0.4}Co_{0.2}Fe_{0.8}O_3$ powder with average grain size of 2 μm and isopropyl alcohol was prepared and spray-coated on the surface of the anti-reaction layer of the laminated sintered compact to form a coating layer for an oxygen electrode layer, fired at 1100° C. for 4 hours to form an oxygen electrode layer and the fuel cell with 170 mm in length was produced as illustrated in FIG. 1.

Then, while passing hydrogen gas through the interior of the fuel cell, the porous support body and the fuel electrode layer was subjected to reduction treatment at 850° C. for 10 hours.

From the images of scanning electron microscope (×30), the thickness T11 of the bottom portion, the thickness T12 of the top portion, which were the thicknesses at 5 mm from bottom and top end of the fuel cell (porous substrate), respectively, and the thickness T2 at the position of the center portion were measured. Furthermore, from the images of metallurgical microscope (×30), the width B11 of the bottom portion, the width B12 of the top portion, which were the widths at 5 mm from bottom and top end of the fuel cell (porous substrate), respectively, and the width B2 at the position of the center were measured. The results of these measurements were listed in Table 1.

Also, fuel gas was passed through the gas-flow passage in the fuel cell, flowing air was passed over the fuel cell exterior, the fuel cell was heated to 750° C. using an electric furnace and an electric generation test was performed. The power density after 3 hours was measured and the power densities for all samples were not less than 0.23 W/cm².

Then, in order to confirm the mechanical strength of the bottom portion of the solid-oxide fuel cell, the measurement of the bottom portion of the fuel cell was performed as follows: the bottom portion (up to 5 mm from the bottom end) of the fuel cell produced was fixed upright in a fixture using crystallized glass; the top portion (5 mm from the top end) of the fuel cell was pushed gradually in the direction vertical to the direction of the fuel cell standing until a crack was formed in the bottom portion of the fuel cell; the pushed distance of the top portion (the travel distance of the position at 5 mm from the top) until the crack formation was measured. The results were listed in Table 1.

TABLE 1

| Sample No. | Center portion Thickness T2 mm | Bottom Portion Thickness T11 mm | Top Portion Thickness T12 mm | T11/T2 % | T12/T2 % |
|---|---|---|---|---|---|
| 1 | 2.096 | 2.125 | 2.117 | 101.38 | 101.00 |
| 2 | 2.084 | 2.126 | 2.129 | 102.02 | 102.16 |
| 3 | 2.078 | 2.108 | 2.116 | 101.44 | 101.83 |
| 4 | 2.090 | 2.118 | 2.120 | 101.34 | 101.44 |
| 5 | 2.095 | 2.129 | 2.120 | 101.62 | 101.19 |

| Sample No. | Center Portion Width B2 mm | Bottom Portion Width B11 mm | Top Portion Width B12 mm | B11/B2 % | B12/B2 % | Pushed Distance mm |
|---|---|---|---|---|---|---|
| 1 | 27.48 | 27.59 | 27.66 | 100.40 | 100.66 | 5.45 |
| 2 | 27.22 | 27.37 | 27.35 | 100.55 | 100.48 | 5.88 |
| 3 | 27.34 | 27.56 | 27.51 | 100.80 | 100.62 | 4.84 |
| 4 | 27.37 | 27.57 | 27.55 | 100.73 | 100.66 | 4.99 |
| 5 | 27.39 | 27.67 | 27.61 | 101.02 | 100.80 | 5.74 |

From Table 1, because the thicknesses T11, T12 at top and bottom portions in the longitudinal direction of the porous substrate were thicker than the thickness T2 at the center portion in the longitudinal direction, the power density of the fuel cell was great and not less than 0.23 W/cm², and the pushed distance of the sample was great and not less than 4 mm, indicating that the mechanical strengths of the top and bottom portions of the fuel cell were great.

REFERENCE NUMBER

1 Porous substrate
2 Fuel gas passage
3 Fuel electrode layer (First electrode layer)
4 Solid electrolyte layer
6 Oxygen electrode layer (Second electrode layer)
7 Middle Layer
8 Inter-connector layer
9 Electric generating element part
10 Solid-oxide fuel cell
11 Fuel cell stack device
18 Fuel cell module
23 Fuel cell device
B11, B12 Width of end portion
B2 Width of center portion
m1 First side surface
m2 Second side surface
n1 First main surface
n2 Second main surface T11, T12 Thickness of end portion
T2 Thickness at center portion

What is claimed is:

1. A solid-oxide cell, comprising:
a porous substrate comprising
a first main surface,
a second main surface opposite the first main surface,
a first side surface,
a second side surface opposite the first side surface, the first side surface and the second side surface connecting the first main surface to the second main surface, and
at least one gas-flow passage extending in a longitudinal direction through the porous substrate from a first end of the porous substrate to a second end of the porous substrate to form a tunnel, wherein the at least one gas-flow passage defines a first opening in the first end of the porous substrate and a second opening in the second end of the porous substrate, and wherein the porous substrate is flat in a cross-section along the longitudinal direction; and
an element part provided on the first main surface of the porous substrate and comprising
a first electrode layer,
a solid electrolyte layer, and
a second electrode layer;
wherein, along the longitudinal direction and which passes through a center of the porous substrate, a thickness between the first main surface and the second main surface at both the first end and the second end of the porous substrate is greater than a thickness between the first main surface and the second main surface at the center of the porous substrate.

2. A solid-oxide cell according to claim 1, wherein an inter-connector layer is provided on the second main surface of the porous substrate.

3. A solid-oxide cell according to claim 1, wherein the porous substrate is electrically conductive.

4. A solid-oxide cell according to claim 1, wherein, along the longitudinal direction of the porous substrate, a width between the first side surface and the second side surface at both the first end and the second end of the porous substrate is greater than a width between the first side surface and the second side surface at the center of the porous substrate.

5. A solid-oxide cell according to claim 1, wherein the thickness at both the first end and the second end of the porous substrate is not more than 1.03 times the thickness at the center of the porous substrate.

6. A solid-oxide cell according to claim 4, wherein the width at both the first end and the second end of the porous substrate is not more than 1.02 times the width at the center of the porous substrate.

7. A cell stack device connected to a gas tank, comprising an electrically connected plurality of solid-oxide cells described in claim 1, wherein an interior space of the gas tank communicates with the at least one gas-flow passage of the solid-oxide cell.

8. A module, comprising: a storage container containing the solid-oxide cell described in claim 1.

9. A module housing device, comprising: an exterior casing containing the module described in claim 8 and an auxiliary device for operating the module.

10. A solid-oxide cell, comprising:
a porous substrate comprising
a first main surface,
a second main surface opposite the first main surface,
a first side surface,
a second side surface opposite the first side surface, the first side surface and the second side surface connecting the first main surface to the second main surface, and
at least one gas-flow passage extending in a longitudinal direction through the porous substrate from a first end of the porous substrate to a second end of the porous substrate to form a tunnel, wherein the at least one gas-flow passage defines a first opening in the first end of the porous substrate and a second opening in the second end of the porous substrate, and wherein the porous substrate is flat in a cross-section along the longitudinal direction; and
a solid electrolyte layer provided on the first main surface, the first side surface, and the second side surface; and
a second electrode layer provided on the solid electrolyte layer;
wherein, along the longitudinal direction and which passes through a center of the porous substrate, a thickness between the first main surface and the second main surface at both the first end and the second end of the porous substrate is greater than a thickness between the first main surface and the second main surface at the center of the porous substrate.

11. A solid-oxide cell, comprising:
a porous substrate comprising
a first main surface,
a second main surface opposite the first main surface,
a first side surface,
a second side surface opposite the first side surface, the first side surface and the second side surface connecting the first main surface to the second main surface, and
at least one gas-flow passage extending in a longitudinal direction through the porous substrate from a first end of the porous substrate to a second end of the porous substrate to form a tunnel, wherein the at least one gas-flow passage defines a first opening in the first end of the porous substrate and a second opening in the second end of the porous substrate, and wherein the porous substrate is flat in a cross-section along the longitudinal direction; and
an element part provided on the first main surface of the porous substrate and comprising
a first electrode layer,
a solid electrolyte layer, and
a second electrode layer;
wherein, along the longitudinal direction and which passes through a center of the porous substrate, a width between the first side surface and the second side surface at both the first end and the second end of the porous substrate is greater than a width between the first side surface and the second side surface at the center of the porous substrate.

* * * * *